United States Patent Office 3,311,620
Patented Mar. 28, 1967

3,311,620
FUSED RING BENZOTHIADIAZINES
Stanley C. Bell, 114 Walnut Park Drive 19120, and Scott J. Childress, 1704 Hopkinson House, Washington Square S. 19106, both of Philadelphia, Pa.
No Drawing. Filed May 31, 1963, Ser. No. 285,549
22 Claims. (Cl. 260—243)

This invention relates to novel benzothiadiazines having hypotensive, diuretic and central nervous system activities, to intermediates in their preparation and to processes for making these compounds.

This invention resides in a composition of matter having a molecular structure wherein a heterocyclic moiety is fused to the "c" face of a [1,2,4]-benzothiadiazine 1,1-dioxide nucleus. Preferred compounds according to the present invention have the following general formula:

(I)
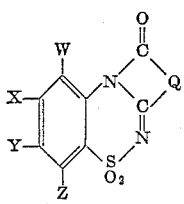

wherein X, W, Y and Z are equivalent and may be the same or different. X, W, Y and Z can be hydrogen, halogen, preferably chlorine or bromine, sulfamyl, mono- and di-alkyl sulfamyl, lower alkyl, and halo(lower) alkyl; Q is an ethylene (—CH$_2$—CH$_2$—), propylene (—CH$_2$CH$_2$CH$_2$—)

vinylene (—HC=CH—); thiodimethylene (—CH$_2$SCH$_2$—)

oxydimethylene (—CH$_2$OCH$_2$—); substituted iminodimethylene (—CH$_2$—N—CH$_2$—)
|
R where R is, for example, lower alkyl, hydrogen, aralkyl, alkoxyalkyl or dialkylaminoalkyl; o-phenylene

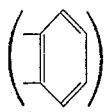

2,3-pyridylene

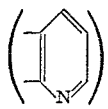

radical, an o-divalent radical of a polynuclear aromatic hydrocarbon such as 1,2-naphthylene or the residue from a 1,2-dicarboxy compound or from a noncyclic 1,3-dicarboxy compound.

It will be apparent from Formula I that in the present compounds, the nitrogen of the thiadiazine ring is a part of the fused ring which also may contain sulfur and oxygen therein. It will also be apparent that the fused ring comprises a nitrogen atom bonded to each of two carbon atoms and is fused to the "c" face of the benzothiadiazine nucleus by that face thereof which consists of the nitrogen atom and one of the adjacent carbon atoms. It should also be noted that the benzene ring may be unsubstituted, partially substituted or substituted in all positions.

The numbering scheme adopted for the compounds of this invention is illustrated below by reference to two typical compounds, the first having a 5-membered, and the second a 6-membered ring, fused to the "c" face of a 1,2,4-benzothiadiazine 1,1-dioxide.

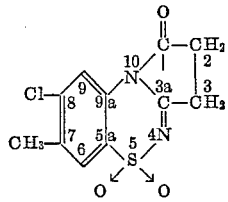

8-chloro-2,3-dihydro-7-methyl-1H - pyrrolo[2,1-c][1,2,4] benzothiadiazine-1-one 5,5-dioxide (preparation given in Example 2).

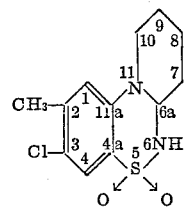

3-chloro-6,6a,7,8,9,10 - hexahydro-2-methylpyrido-(2,1-c) [1,2,4]benzothiadiazine 5,5-dioxide (preparation given in Example 7).

The compounds of this invention are prepared by condensing a sulfamylaniline of the formula:

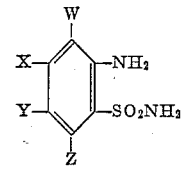
(II)

with an anhydride of the general formula:

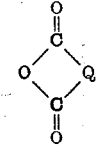
(III)

or an acid of the general formula:

Q(COOH)$_2$ or an acid halide of the general formula:

Q(COhal)$_2$ where W, X, Y, Z and Q are as above stated.

The main reactions in the preparation of the compounds of this invention are summarized below.

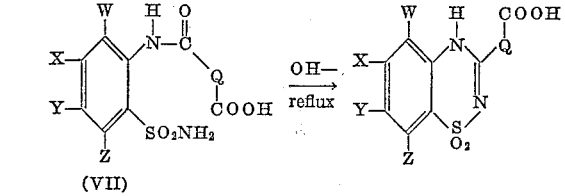
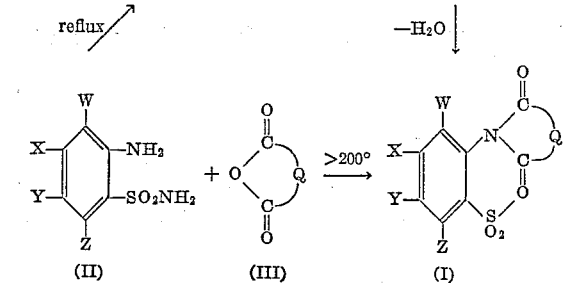

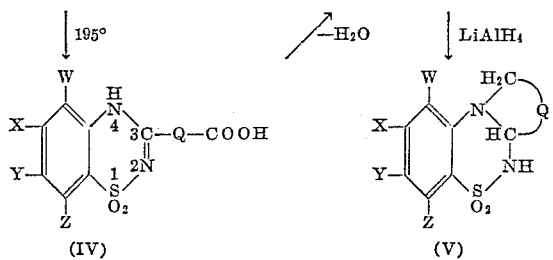
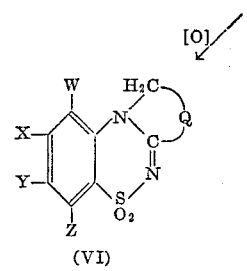
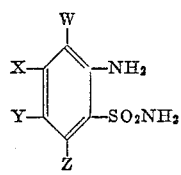

monia to form an amide which is heated to form the final product (Ex. 16, 20, 24 below).

Compound IV can be heated with a dehydrating agent which is non-reactive therewith, such as acetic anhydride, to form a product having Formula I. Ring closure also may be effected by heating the intermediate to above about 200° C. Again, the anhydride and the 2-sulfamylaniline can be refluxed in an inert solvent such as chloroform at the reflux temperature of the solvent to form a carboxy sulfanilide VII which is then refluxed in a base such as ammonium hydroxide to form Compound IV. The latter compound may then be dehydrated to form a compound of Formula I.

The keto group in compounds of Formula I can be reduced by means of lithium aluminum hydride to give active compounds having Formula V. Such compounds may be oxidized with oxidizing agents such as potassium permanganate or peroxy compounds such as $H_2O_2$ to form other active compounds defined by Formula VI.

Alternate synthetic procedures are summarized in the following equations with reference to the particular examples in which they occur:

Where a substituted 2-sulfamylaniline is reacted with an anhydride the final product may be obtained directly by heating for a prolonged period of time above 200° C. If, however, the reaction mixture is heated below 200° C., an intermediate 3-omega-carboxylalkyl or a carboxyaryl compound IV is isolated. Compound IV is tautomeric with 2H forms thereof having a double bond at the 3,4-positions.

Where the substituted 2-sulfamylaniline is reacted with a diacid halide, an intermediate open-chain acid halide is first formed. This compound is then reacted with ammonia to form an amide which is heated to form the final product (Ex. 16, 20, 24 below).

The following examples in which all temperatures are in degrees centigrade illustrate the best mode of practising the invention.

Example 1

A mixture of 2.2 g. (0.01 m.) of 4-chloro-5-methyl-2-sulfamylaniline and 1.2 g. (0.012 m.) of succinic anhydride was gradually heated to 190–210° during which time the reaction mixture melted, later bubbled vigorously and finally resolidified. After cooling the solid was washed with alcohol and recrystallized from dimethylformamide-water giving 7-chloro-2,3-dihydro-8-methyl- 1H-pyrrolo[2,1-c][1,2,4]benzothiadiazine-1 - one 5,5 - dioxide, M.P. 298–300°.

*Analysis.*—Calculated for $C_{11}H_9ClN_2O_3S$: C, 46.40; H, 3.20; N, 9.84; Cl, 12.46; S, 11.26. Found: C, 46.09; H, 3.27; N, 9.79; Cl, 12.70; S, 11.50.

When tested pharmacologically, this compound exhibited hypotensive and antidepressant activity.

Example 2

8-chloro-2,3-dihydro-7-methyl-1H - pyrrolo[2,1-c][1,2,4]benzothiadiazin-1-one 5,5-dioxide, M.P. 263–265°, was prepared from 4.4 g. of 5-chloro-4-methyl-2-sulfamylaniline and 2.4 g. of succinic anhydride according to the procedure of Example 1.

*Analysis.*—Calculated for $C_{11}H_9ClN_2O_3S$: C, 46.40; H, 3.20; N, 9.84; Cl, 12.46; S, 11.26. Found: C, 46.57; H, 3.46; N, 10.03; Cl, 12.40; S, 11.08.

When tested pharmacologically, this compound exhibited hypotensive and antidepressant activity.

Example 3

3-chloro-2-methyl - 11H - isoindolo[1,2-c][1,2,4]benzothiadiazin-11-one 5,5-dioxide, M.P. 315–317° was prepared from 2.2 g. of 4-chloro-5-methyl-2-sulfamylaniline and 1.8 g. of phthalic anhydride according to the procedure of Example 1.

*Analysis.*—Calculated for $C_{15}H_7ClN_2O_3S$: C, 54.14; H, 2.73; N, 8.42; Cl, 10.65; S, 9.60. Found: C, 54.01; H, 2.65; N, 8.34; Cl, 10.60; S, 9.60.

Example 4

7 - chloro - 8 - methyl - 1H - pyrrolo[2,1 - c][1,2 - 4] benzothiadiazin-1-one 5,5-dioxide, M.P. 261–263, was prepared from 4.4 g. 4-chloro-5-methyl-2-sulfamylaniline and 2.2 g. maleic anhydride according to the procedure of Example 1.

*Analysis.*—Calculated for $C_{11}H_7ClN_2O_3S$: C, 46.73; H, 2.49; N, 9.91; Cl, 12.54; S, 11.34. Found: C, 46.66; H, 2.43; N, 11.92; Cl, 9.85; S, 18.00.

When tested pharmacologically, this compound exhibited antitremorine action and activity against metrazole convulsions.

Example 5

8 - chloro - 2,3 - dihydro - 7 - sulfamyl - 1H - pyrrolo[2,1 - c][1,2,4]benzothiadiazin - 1 - one 5,5 - dioxide, M.P. >300°, was prepared by fusing of 2.85 g. 5-chloro-2,4-disulfamylaniline and 2.2 g. succinic anhydride at 235–240° according to the procedure of Example I.

*Analysis.*—Calculated for $C_{10}H_8ClN_3O_5S_2$: C, 34.33; H, 2.31; N, 12.02; Cl, 10.14; S, 18.33. Found: C, 34.35; H, 2.43; N, 11.92; Cl, 9.85; S, 18.00.

When tested pharmacologically, this compound exhibited diuretic activity.

Example 6

A mixture of 6.4 g. of 4-chloro-5-methyl-2-sulfamylaniline and 4.5 g. of glutaric anhydride was heated at 190° for 15 minutes during which time the reaction mixture fused, bubbled and resolidified. After cooling the solid was ground and washed with ethanol. Recrystallization was accomplished by dissolving the compound in an aqueous alcoholic sodium carbonate solution, filtering from impurities and precipitating out by acidification with acetic acid. There was obtained a light gray solid, 7 - chloro - 3 - (3 - carboxypropyl) - 6 - methyl - 1,2,4-benzothiadiazine, 1,1-dioxide, M.P. 289–290.

*Analysis.*—Calculated for $C_{12}H_{13}ClN_2O_4S$: C, 45.50; H, 4.14; N, 8.85; Cl, 11.19; S, 10.12. Found: C, 45.28; H, 3.85; N, 8.91; Cl, 11.00; S, 10.00.

The above compound when tested pharmaceutically exhibited hypotensive activity.

A mixture of 4.0 g. of the above acid and 40 ml. of acetic anhydride was refluxed for 1½ hours, cooled and filtered from insoluble material. The filtrate was concentrated to dryness in vacuo and the residue was recrystallized several times from ethyl acetate giving 3-chloro-2 - methyl - 7,8,9,10 - tetrahydropyrido[2,1 - c][1,2,4] benzothiadiazin-10-one, 5,5-dioxide, M.P. 219–220°.

*Analysis.*—Calculated for $C_{12}H_{11}ClN_2O_3S$: C, 48.24; H, 3.71; N, 9.38; Cl, 11.87; S, 10.73. Found: C, 48.17; H, 3.55; N, 9.27; Cl, 11.60; S, 10.60.

When tested pharmacologically, this compound exhibited hypotensive activity.

Example 7

To a suspension 1.0 g. of lithium aluminum hydride in 75 ml. of ether was added portionwise with stirring and cooling 2.7 g. of 3-chloro-2-methyl-7,8,9,10-tetrahydropyrido[2,1-c][1,2,4]benzothiadiazin - 10-one 5,5-dioxide. After one-half hour the reaction mixture was carefully decomposed with 10 ml. of water and filtered. The mixture of solids was treated with 2 N hydrochloric acid to dissolve the inorganic salts and the product was collected and recrystallized from ethanol giving 3-chloro-6,6a,7,8,9,10 - hexahydro - 2-methylpyrido[2,1-c][1,2,4]benzothiadiazine 5,5-dioxide, M.P. 216–218°.

*Analysis.*—Calculated for $C_{12}H_{15}ClN_2O_2S$: C, 50.26; H, 5.27; N, 9.77; Cl, 12.36; S, 11.18. Found: C, 50.48; H, 5.28; N, 9.69; Cl, 11.90; S, 11.10.

When tested pharmacologically, this compound exhibited sedative activity.

Example 8

An alkaline solution of 3-chloro-6,6a,7,8,9,10-hexahydro-2 - methylpyrido[2,1-c][1,2,4]benzothiadiazine 5,5-dioxide was treated with solution of potassium permanganate until the purple color no longer disappeared. The solids were filtered and washed with water and alcohol. The product was extracted from the inorganic salts with dimethyl formamide and dilution with water precipitated out the 3 - chloro-2-methyl-7,8,9,10-tetrahydropyrido[2,1-c][1,2,4]benzothiadiazine 5,5-dioxide, M.P. 292–294°.

*Analysis.*—Calculated for $C_{12}H_{13}ClN_2O_2S$: C, 50.60; H, 4.60; N, 9.84. Found: C, 50.51; H, 4.71; N, 10.02.

When tested pharmacologically, this compound exhibited hypotensive activity.

Example 9

2 - chloro - 7,10-epoxy-3,10-dimethyl-6b,7,8,9,10,10a-hexahydro - 11H - isoindolo[1,2-c][1,2,4]benzothiadiazin-11-one 5,5-dioxide, M.P. 275–277°, was prepared from 4.4 g. of 5-chloro-4-methyl-2-sulfamylaniline and 4.0 g. of 3,6-epoxy - 3 - methylhexahydrophthalic anhydride according to the procedure of Example 1.

*Analysis.*—Calcd. for $C_{16}H_{15}ClN_2O_4S$: C, 52.39; H, 4.12; N, 7.64; S, 8.74. Found: C. 52.03; H, 3.88; Cl, 9.70; N, 7.91; S, 8.70.

Example 10

8 - chloro - 2,3-dihydro-7-sulfamyl-1H-pyrrolo[2,1-c][1,2,4]benzothiadiazin-1-one 5,5 - dioxide was prepared by heating a mixture of 17 g. of 2,4-disulfamyl-5-chloroaniline, 23 g. of succinic anhydride and 200 ml. of "Dowtherm" at 230–240° for 2 hrs.

Example 11

A mixture of 4.4 g. of 4-chloro-5-methyl-2-sulfamylaniline, 2.2 g. of succinic anhydride and 30 ml. of tetralin was refluxed for 4 hrs. Upon cooling there was obtained 7 - chloro-2,3-dihydro-8-methyl-1H-pyrrolo[2,1-c][1,2,4]benzothiadiazin-1-one 5,5-dioxide.

Example 12

8 - chloro - 2,3,3a,4-tetrahydro-7-sulfamyl-1H-pyrrolo[2,1-c][1,2,4]benzothiadiazine 5,5-dioxide, M.P. 277–280, was prepared from the reaction of 8-chloro-2,3-dihydro - 7 - sulfamyl - 1H - pyrrolo[2,1-c][1,2,4]benzothiadiazine-1-one 5,5-dioxide with lithium aluminum anhydride according to the procedure of Example 7.

*Analysis.*—Calcd. for $C_{10}H_{12}ClN_3O_4S_2$: C, 35.55; H, 3.58; Cl, 10.49; N, 12.43; S, 18.98. Found: C, 35.41; H, 3.51; Cl, 10.35; N, 12.12; S, 18.75.

When tested pharmacologically this compound exhibited diuretic activity.

*Example 13*

A mixture of 6.6 g. of 4-chloro-5-methyl-2-sulfamylaniline and 5.7 g. of quinolinic anhydride was refluxed in 150 ml. of chloroform for 18 hours. The solid was filtered and recrystalized from alcohol-water to give 4'-chloro - 5' - methyl-2'-sulfamyl-2-carboxynicotinanilide, M.P. 221–223° C.

*Analysis.*—Calcd. for $C_{14}H_{12}ClN_3O_5S$: C, 45.47; H, 3.27; Cl, 9.59; N, 11.36; S, 8.69. Found: C, 45.37; H, 3.36; Cl, 9.50; N, 11.25; S, 8.50.

*Example 14*

A solution of 1.0 g. of 4'-chloro-5'-methyl-2'-sulfamyl-2-carboxynicotinanilide in 25 ml. of concentrated ammonium hydroxide solutions was refluxed for ¾ hour and then acidified with acetic acid. The resultant solid was filtered and recrystallized from acetonitrile to give 3-[7-chloro 6 - methyl-1,1-dioxo-4H-1,2,4-benzothiadiazin-3-yl]picolinic acid, M.P. 222–224° C.

*Example 15*

A mixture of 1.3 g. of 3-[7-chloro-6-methyl-1,1-dioxo-4H-1,2,4-benozthiadiazin-3-yl]picolinic acid in 15 ml. of acetic anhydride was heated until all the solid had dissolved and then the reaction mixture was cooled. The solid that precipitated was 8-chloro-9-methyl-12H-pyrido[3'2':3.4]pyrrolo[2,1-c][1,2,4]benzothiadiazin - 12 - one 6,6-dioxide, M.P. 273–275° C.

*Analysis.*—Calcd. for $C_{14}H_8ClN_3O_3S$: C, 50.39; H, 2.42; N, 12.59. Found: C, 50.59; H, 2.57; N, 12.70.

*Example 16*

A mixture of 15 g. of 4-chloro-5-methyl-2-sulfamylaniline and 15 g. of succinoyl chloride is warmed in chloroform to give 4'-chloro-5'methyl-2'sulfamylsuccinanilic chloride.

*Example 17*

Three grams of 4'-chloro-5'-methyl-2'-sulfamylsuccinanilic chloride is hydrolyzed with dilute alkali to 4'-chloro-5'-methyl-2'-sulfamylsuccinanilic acid, M.P. 182–184°.

*Example 18*

A mixture of 4.4 g. of 4-chloro-5-methyl-2-sulfamylaniline and 2.2 g. of succinic anhydride was fused at 140–150° for 20 minutes and the reaction mixture recrystallized from alcohol-water and then ethyl acetate. There was obtained 4'-chloro-5'-methyl-2'-sulfamylsuccinanilic acid, M.P. 182–184° C.

*Analysis.*—Calcd. for $C_{11}H_{13}ClN_2O_5S$: C, 41.20; H, 4.09; Cl, 11.06; N, 8.74; S, 10.00. Found: C, 41.45; H, 4.12; Cl. 11.00; S, 9.90; N, 8.85.

*Example 19*

Two grams of 4'-chloro-5'-methyl-2'-sulfamylsuccinanilic chloride is treated with an ammonium hydroxide solution giving 3-(7-chloro-1,1-dioxo-6-methyl-4H-1,2,4-benzothiadiazin-3-yl)propionamide, M.P. 278–280° dec.

*Example 20*

A mixture of 1.3 g. of 7-chloro-2,3-dihydro-8-methyl-1H - pyrrolo[2,1 - c][1,2,4]benzothiadiazin - 1 - one 5,5-dioxide when heated in 60 cc. of an alcoholic ammonium hydroxide solution gave 3-(7-chloro-1,1-dioxo-6-methyl-4H - 1,2,4 - benzothiadiazin - 3 - yl)propionamide, M.P. 278–280° dec.

*Analysis.*—Calcd. for $C_{11}H_{12}ClN_3O_3S$: C, 43.79; N, 4.01; Cl, 11.75; N, 13.93. Found: C, 48.86; N, 4.16; Cl, 11.70; N, 14.25.

*Example 21*

When 5.0 g. of 4'-chloro-5'-methyl-2'-sulfamylsuccinanilic chloride is warmed in ethanol, there is obtained 4'-chloro - 5' - methyl - 2' - sulfamyl - 3 - carbethoxypropionanilide.

*Example 22*

A mixture of 3.0 g. of 4'-chloro-5'-methyl-2'-sulfamyl-3-carbethoxypropionanilide is heated in an aqueous alcoholic ammonium hydroxide solution to give 3-(7-chloro-6 - methyl - 1,1 - dioxo - 4H - 1,2,4 - benzothiadiazin - 3 - yl)propionic acid, ethyl ester.

*Example 23*

A mixture of 2.0 g. of 7-chloro-2,3-dihydro-8-methyl-1H - pyrrolo[2,1 - c][1,2,4]benzothiadiazin - 1 - one 5,5-dioxide is refluxed in ethyl alcohol containing a catalytic amount of alkali and upon cooling there is obtained 3-(7-chloro - 6 - methyl - 1,1 - dioxo - 4H - 1,2,4 - benzothiadiazin-3-yl)propionic acid, ethyl ester.

*Example 24*

A mixture of 2.0 g. of either 3-(7-chloro-6-methyl-1,1-dioxo - 4H - 1,2,4 - benzothiadiazin - 3 - yl)propionic acid, ethyl ester or 3-(7-chloro-6-methyl-1,1-dioxo-4H-1,2,4-benzothiadiazin-3-yl)propionamide is refluxed in acetic anhydride to give 7-chloro-2,3-dihydro-8-methyl-1H-pyrrolo[2,1 - c][1,2,4]benzothiadiazin - 1 - one 5,5 - dioxide, M.P. 298–300°.

*Example 25*

4' - chloro - 5' - methyl - 2 - methylene - 2' - sulfamylsuccinanilic acid, M.P. 181–184°, was prepared from 11.0 g. of 4-chloro-5-methyl-2-sulfamylaniline and 0.7 g. itaconic anhydride according to the procedure of Example 13.

*Analysis.*—Calcd. for $C_{12}H_{13}ClN_2O_5S$: C, 43.20; H, 3.93; Cl, 10.65; N, 8.41; S, 9.64. Found: C, 43.52; N, 3.85; Cl, 10.50; N, 8.51; S, 9.60.

*Example 26*

2 - [(7 - chloro - 6 - methyl - 1,1 - dioxo - 2H - 1,2,4-benzothiadiazin-3-yl)methyl]acrylic acid, M.P. 285–290°, was prepared from 4.5 g. 4'-chloro-5'-methyl-2-methylene-2'-sulfamylsuccinanilic acid and 100 ml. ammonium hydroxide according to the procedure of Example 14.

*Analysis.*—Calcd. for $C_{12}H_{11}ClN_2O_4S$: C, 45.7; H, 3.52; Cl, 11.27; N, 8.88; S, 10.18. Found: C, 45.85; H, 3.41; Cl, 11.20; N, 8.99; S, 10.16.

*Example 27*

2 - nitro - 3 - dimethylsulfamyl - 13H - naphtho[2',1':3,4]pyrrolo[2,1 - c][1,2,4]benzothiadiazin - 13 - one 5,5-dioxide is obtained by the procedure of Example 1 by reacting 5 - nitro - 4 - dimethylsulfamyl - 2 - sulfamylaniline and 1,2-naphthalenedicarboxylic acid anhydride.

When the following reactants are treated by the process steps of Examples 1, 7, 8, respectively, the corresponding products hereinafter disclosed are obtained in the order given:

| Reactants | Products |
|---|---|
| 4-bromo-2,6-disulfamylaniline and succinic anhydride. | (1) 7-bromo-2,3-dihydro-9-sulfamyl-1H-pyrrolo[2,1-c][1,2,4] benzothiadiazin-1-one 5,5-dioxide.<br>(2) 7-bromo-9-sulfamyl-2,3,3a,4-tetrahydro-1H-pyrrolo [2,1-c][1,2,4] benzothiadiazine 5,5-dioxide.<br>(3) 7-bromo-9-sulfamyl-2,3-dihydro-1H-pyrrolo[2,1-c][1,2,4] benzothiadiazine 5,5-dioxide. |
| 5-trifluoromethyl-4-methylsulfamyl-2-sulfamylaniline and succinic anhydride. | (1) 8-trifluoromethyl-2-3-dihydro-7-methylsulfamyl-1H-pyrrolo [2,1-c][1,2,4]benzothiadiazin-1-one 5,5-dioxide.<br>(2) 7-methylsulfamyl-8-trifluoromethyl-2,3,3a,4-tetrahydro-1H-pyrrolo[2',1',3,4][1,2,4] benzothiazine 5,5-dioxide.<br>(3) 7-methylsulfamyl-8-trifluoromethyl-2,3-dihydro-1H-pyrrolo [2,1-c][1,2,4] benzothiadiazine 5,5-dioxide. |

| Reactants | Products |
|---|---|
| 4-methyl-2,5-disulfamylaniline and succinic anhydride. | (1) 2,3-dihydro-7-methyl-8-sulfamyl-1H-pyrrolo[2,1-c][1,2,4]benzothiodiazin-1-one 5,5-dioxide.<br>(2) 7-methyl-8-sulfamyl-2,3,3a,4-tetrahydro-1H-pyrrolo-[2,1-c][1,2,4]benzothiadizine 5,5-dioxide.<br>(3) 7-methyl-8-sulfamyl-2,3-dihydro-1H-pyrrolo[2,1-c][1,2,4]benzothiadiazine 5,5-dioxide. |
| 3,5-dichloro-2-sulfamylaniline and succinic anhydride. | (1) 6,8-dichloro-2,3-dihydro-1H-pyrrolo[2,1-c][1,2,4] benzothiadiazin-1-one 5,5-dioxide.<br>(2) 6,8-dichloro-2,3,3a,4-tetrahydro-1H-pyrrolo [2,1-c][1,2,4] benzothiadiazine 5,5-dioxide.<br>(3) 6,8-dichloro-2,3-dihydro-1H-pyrrolo[2,1-c][1,2,4] benzothiadiazine 5,5-dioxide. |
| 2-sulfamylaniline and succinic anhydride. | (1) 2,3-dihydro-1H-pyrrolo [2,1-c][1,2,4]benzothiadiazine-1-one 5,5-dioxide.<br>(2) 2,3,3a,4-tetrahydro-1H-pyrrolo [2,1-c][1,2,4]benzothiadiazine 5,5-dioxide.<br>(3) 2,3-dihydro-1H-pyrrolo[2,1-c][1,2,4]benzothiadiazine 5,5-dioxide. |
| 2-sulfamyl-5-chloroaniline and succinic anhydride. | (1) 8-chloro-2,3-dihydro-1H-pyrrolo[2,1-c][1,2,4]benzothiadiazin-1-one 5,5-dioxide.<br>(2) 8-chloro-2,3,3a,4-tetrahydro-1H-pyrrolo[2,1-c][1,2,4]benzothiadiazine 5,5-dioxide.<br>(3) 8-chloro-2,3-dihydro-1H-pyrrolo[2,1-c][1,2,4]benzothiadiazine 5,5-dioxide. |

In addition to the utilities above mentioned, all the compounds of the present invention are useful in exploring biological mechanisms in laboratory animals.

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:

1. A compound of the class represented by the formulae:

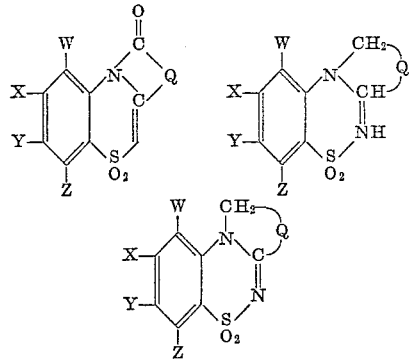

wherein W, X, Y and Z are selected from the group consisting of hydrogen, halogen, lower alkyl, halo(lower) alkyl, sulfamyl, and alkylsulfamyl; and Q is a divalent radical selected from the group consisting of the ethylene, propylene, vinylene, o-phenylene, 1,2-naphthylene, 2,3-pyridylene, thiodimethylene, oxydimethylene, iminodimethylene, and methylene substituted ethylene.

2. A compound selected from group having the formula:

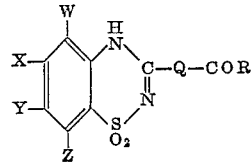

wherein W, X, Y and Z are selected from the group consisting of hydrogen, halogen, lower alkyl, halo lower alkyl, sulfamyl and alkylsulfamyl; R is selected from the group consisting of hydroxy, amido and lower alkoxy, and Q is selected from the group consisting of ethylene, propylene, vinylene, o-phenylene, 1,2-naphthylene, 2,3-pyridylene radicals, thiodimethylene, oxydimethylene, iminodimethylene, methylene substituted ethylene compound and the tautomeric form of said selected compound having a double bond at the 3,4-positions.

3. 7 - chloro - 2,3-dihydro-8-methyl-1H-pyrrolo[2,1-c][1,2,4]benzothiadiazin-1-one 5,5-dioxide.

4. 8 - chloro - 2,3-dihydro-7-methyl-1H-pyrrolo[2,1-c][1,2,4]benzothiadiazin-1-one 5,5 dioxide.

5. 3 - chloro - 2-methyl-11H-isoindolo[1,2-c][1,2,4]benzothiadiazin-11-one 5,5-dioxide.

6. 7 - chloro - 8-methyl-1H-pyrrolo[2,1-c][1,2,4]benzothiadiazin-1-one 5,5-dioxide.

7. 8 - chloro - 2,3 - dihydro - 7-sulfamyl-1H-pyrrolo[2,1-c][1,2,4]benzothiadiazin-1-one 5,5-dioxide.

8. 7 - chloro - 3 - (3-carboxypropyl)-6-methyl-1,2,4-benzothiadiazine 1,1-dioxide.

9. 3 - chloro - 2-methyl - 7,8,9,10 - tetrahydro-pyrido[2,1-c][1,2,4]benzothiadiazine-10-one 5,5-dioxide.

10. 3 - chloro - 6,6a,7,8,9,10 - hexahydro - 2-methyl-pyrido[2,1-c][1,2,4]benzothiadiazine 5,5-dioxide.

11. 3 - chloro - 2-methyl - 7,8,9,10-tetrahydro-pyrido[2,1-c][1,2,4]benzothiadiazine 5,5-dioxide.

12. 2 - chloro - 7,10-epoxy-3,10-dimethyl-6b,7,8,9,10,10a - hexahydro - 11H-isoindolo[1,2-c][1,2,4]benzothiadiazin-11-one 5,5-dioxide.

13. 8 - chloro - 2,3,3a,4 - tetrahydro-7-sulfamyl-1H-pyrrolo[2,1-c][1,2,4]benzothiadiazine 5,5-dioxide.

14. 3 - [7-chloro - 6-methyl-1,1-dioxo-4H-1,2,4-benzothiadiazin-3-yl]picolinic acid.

15. 8 - chloro - 9-methyl-12H-pyrido[3',2':3,4]pyrrolo[2,1-c][1,2,4]benzothiadiazin-12-one 6,6-dioxide.

16. 3 - (7 - chloro-1,1-dioxo-6-methyl-4H-1,2,4-benzothiadiazin-3yl)propionamide.

17. 3 - (7 - chloro-1,1-dioxo-6-methyl-4H-1,2,4-benzothiadiazin-3-yl)propionic acid, ethyl ester.

18. 2 - [(7 - chloro-1,1-dioxo-6-methyl-2H-1,2,4-benzothiadiazin-3yl)methyl]acrylic acid.

19. A process for preparing the compounds of claim 1 which comprises condensing a 2-sulfamylaniline with a member of the group consisting of succinic acid, phthalic acid, maleic acid, 3,6-epoxy-3-methylhexahydrophthalic acid, quinolinic acid, itaconic acid, 1,2-naphthalenedicarboxylic acid, glutaric acid, and the acids, acid halides, and the anhydrides of said acids in an inert solvent at the reflux temperature of the mixture.

20. The process which comprises heating in an inert solvent at the reflux temperature of the mixture a compound of the formula:

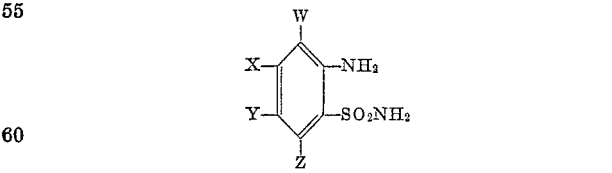

wherein W, X, Y and Z are selected from the group consisting of hydrogen, halogen, lower alkyl, halo(lower) alkyl sulfamyl and alkylsulfamyl with a compound selected from the group consisting of the anhydrides having the formula:

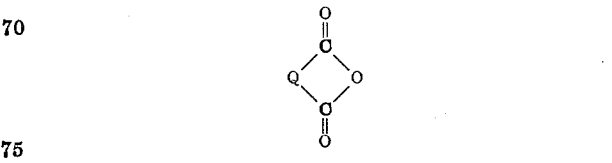

acids having the formula Q(COOH)$_2$ and the acid halides of the formula Q(COhal)$_2$, wherein Q is a divalent radical selected from the group consisting of ethylene, propylene, vinylene, 2,3-pyridylene, o-phenylene, 1,2-naphthylene, thiodimethylene, oxydimethylene, iminodimethylene, and methylene substituted ethylene.

21. The process which comprises reducing a compound of the formula:

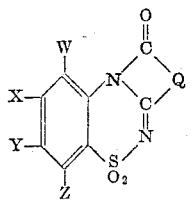

wherein W, X, Y and Z are selected from the group consisting of hydrogen, halogen, lower alkyl, halo(lower) alkyl sulfamyl and alkylsulfamyl, and Q is a divalent radical selected from the group consisting of ethylene, propylene, vinylene, o-phenylene, 1,2-naphthylene, 2,3-pyridylene, thiodimethylene, oxydimethylene, iminodimethylene, and methylene substituted ethylene, with lithium aluminum hydride to form a compound of the formula:

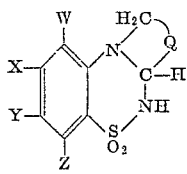

wherein W, X, Y and Q are as above stated.

22. The process which comprises oxidizing a compound of the formula:

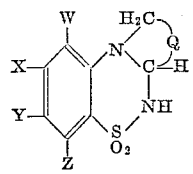

wherein W, X, Y and Z are selected from the group consisting of halogen, lower alkyl, halo lower alkyl, sulfamyl and alkylsulfamyl; and Q is a divalent radical selected from the group consisting of ethylene, propylene, vinylene, o-phenylene, thiodimethylene, oxydimethylene, iminodimethylene, methylene substituted ethylene, 1,2-naphthylene, 2,3-pyridylene, with an oxidizing agent selected from the group consisting of potassium permanganate and hydrogen peroxide to form a compound of the formula:

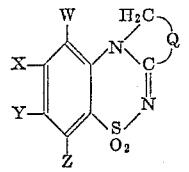

wherein W, X, Y, X and Q are as above stated.

References Cited by the Examiner

UNITED STATES PATENTS 3,078,270  2/1963  Close et al. _____ 260—243

FOREIGN PATENTS 1,149,719  6/1963  Germany.

NICHOLAS S. RIZZO, *Primary Examiner.*